United States Patent
Davey et al.

(10) Patent No.: US 9,459,097 B2
(45) Date of Patent: Oct. 4, 2016

(54) TILT SENSING APPARATUS, SYSTEM AND METHOD FOR USING SAME

(71) Applicants: John S Davey, Bolingbrook, IL (US); James D Pechous, Lombard, IL (US); Christopher J Davey, Bolingbrook, IL (US); Stephen L Davey, Ramsay, MI (US)

(72) Inventors: John S Davey, Bolingbrook, IL (US); James D Pechous, Lombard, IL (US); Christopher J Davey, Bolingbrook, IL (US); Stephen L Davey, Ramsay, MI (US)

( * ) Notice: Subject to any disclaimer, the term of this patent is extended or adjusted under 35 U.S.C. 154(b) by 117 days.

(21) Appl. No.: 14/205,890

(22) Filed: Mar. 12, 2014

(65) Prior Publication Data
US 2015/0260516 A1    Sep. 17, 2015

(51) Int. Cl.
*A01D 75/18*    (2006.01)
*G01C 9/02*    (2006.01)
*B60K 25/00*    (2006.01)
*A01D 75/28*    (2006.01)
*B60W 40/10*    (2012.01)
*B60G 21/00*    (2006.01)

(52) U.S. Cl.
CPC ............... *G01C 9/02* (2013.01); *A01D 75/18* (2013.01); *A01D 75/28* (2013.01); *B60K 25/00* (2013.01); *B60W 40/10* (2013.01)

(58) Field of Classification Search
USPC .............. 701/45, 124, 36, 38, 116, 33.9, 65; 180/271; 280/755; 56/10.2 R
See application file for complete search history.

(56) References Cited

U.S. PATENT DOCUMENTS

| | | | | |
|---|---|---|---|---|
| 5,410,487 A | * | 4/1995 | Okayama | G01C 25/005 701/502 |
| 6,556,908 B1 | * | 4/2003 | Lu | B60G 17/0185 180/271 |
| 6,929,333 B2 | * | 8/2005 | DeVlieg | B60T 8/1703 188/1.11 L |
| 7,835,832 B2 | * | 11/2010 | Macdonald | A01B 69/008 701/24 |
| 8,275,516 B2 | * | 9/2012 | Murphy | A01B 69/00 701/124 |
| 8,352,116 B2 | * | 1/2013 | Boylston | A01D 75/28 56/10.2 R |
| 2003/0078700 A1 | * | 4/2003 | Chee | B60G 17/01908 701/1 |
| 2004/0098185 A1 | * | 5/2004 | Wang | B60T 8/1706 701/70 |
| 2006/0293826 A1 | * | 12/2006 | Hong | G01C 21/16 701/96 |
| 2010/0131198 A1 | * | 5/2010 | Chang | G01C 25/00 701/533 |

(Continued)

*Primary Examiner* — Thomas Tarcza
*Assistant Examiner* — Richard Goldman
(74) *Attorney, Agent, or Firm* — Lempia Summerfield Katz LLC (57) ABSTRACT

A tilt sensing apparatus, a system and a method detect the tilt of a vehicle using tilt sensing devices mounted to the vehicle. An accelerometer and a gyroscope provide orientation data to a processor. The processor calculates the tilt of the vehicle and provides an audible indication and/or a visual indication to an operator of the vehicle via a communications module. The communications module has a display panel accessible to the operator for receiving the tilt information. The system provides tilt information for different amounts of tilt of the vehicle. The method of detecting the tilt of the vehicle accumulates position data from the accelerometer and the gyroscope to provide tilt indications to the operator. The apparatus, system and method compare a tilt angle to preset values and generate corresponding output signals to the operator if the preset values are exceeded. The system disables a power take-off connected to the vehicle in the event of a tilt condition in which the vehicle may roll over.

11 Claims, 8 Drawing Sheets

(56) References Cited

U.S. PATENT DOCUMENTS

| | | | | |
|---|---|---|---|---|
| 2010/0191408 A1* | 7/2010 | Boylston | G01C 9/00 | 701/31.4 |
| 2010/0198446 A1* | 8/2010 | Erb | B60R 21/0132 | 701/31.4 |
| 2013/0041577 A1* | 2/2013 | Puhalla | B60W 40/11 | 701/124 |
| 2013/0110389 A1* | 5/2013 | Solbrack | B60G 17/01908 | 701/124 |
| 2014/0277888 A1* | 9/2014 | Dastoor | B60L 15/20 | 701/22 |
| 2014/0358378 A1* | 12/2014 | Howard | B60N 2/501 | 701/45 |
| 2014/0371976 A1* | 12/2014 | Gilling | G01F 23/0061 | 701/29.1 |
| 2015/0066339 A1* | 3/2015 | Hoare | B60G 17/019 | 701/116 |
| 2015/0094880 A1* | 4/2015 | Beard | A63H 17/36 | 701/2 |
| 2015/0120158 A1* | 4/2015 | Vande Haar | F16H 61/16 | 701/65 |
| 2015/0176253 A1* | 6/2015 | Taylor | E02F 3/3414 | 701/50 |
| 2015/0239409 A1* | 8/2015 | Mousa | B62D 49/08 | 701/45 |
| 2015/0260516 A1* | 9/2015 | Davey | G01C 9/02 | 701/36 |

\* cited by examiner

TILT SENSING APPARATUS, SYSTEM AND METHOD FOR USING SAME

BACKGROUND OF THE INVENTION

The present invention generally relates to a tilt sensor. More specifically, the present invention relates to a tilt sensing apparatus, a system and a method for using same to provide an indication of tilt for a variety of vehicles.

Millions of vehicles are on the road today. Certain types of vehicles may also travel off the road. For example, SUVs, 4×4s, Jeeps® (a registered trademark of Chrysler Group LLC) and the like may travel on the road and off the road. Other types of vehicles, for example, sand rails, dune buggies and the like may be purpose-built to be used off the road for pleasure and/or entertainment. Moreover, military vehicles, industrial vehicles, farm vehicles and the like may be used primarily off the road on battlefields, in quarries, in mines, on farms, in fields, and in other locations that are not graded or paved for normal vehicle usage.

Further, many vehicles have powered implements for performing a variety of different tasks. Such vehicles have a power take-off ("PTO"). The PTO is any of several methods for taking power from a power source, such as a running engine, and transmitting the power to an application such as an attached implement or separate machine, for example. Typically, the PTO is a system using a splined output shaft on a tractor or truck, designed so that a PTO shaft, a kind of drive shaft, may be connected and disconnected, and a corresponding input shaft on the application end. The PTO allows implements to draw energy from the engine.

Vehicles with powered implements driven by a PTO may be, for example, lawnmowers, tractors, lawn tractors, soil tillers, snow throwers and the like. Many vehicles with powered implements are self-propelled, and an operator may ride on the vehicle. Vehicles with powered implements may tilt as they travel over sloped surfaces, such as hills and/or uneven terrain, for example. Such sloped surfaces are often encountered due to the nature of the work being performed and/or the area in which the work is performed. As a result, the vehicle with a powered implement may be required to travel over such sloped surfaces.

However, if a vehicle with a powered implement tilts too much, the vehicle may potentially tip over and/or slide down an incline. Vehicles with powered implements have been equipped with various tilt sensors to provide the driver with an indication that the vehicle is approaching a tilt limit and to disable the powered implement. Axial inclinometers and tip switches are examples of commonly used devices.

Tilt sensors may be used to provide input control signals for controlling, for example, machinery, devices and/or the like. Further, tilt sensors may be used in many different applications. For example, tilt sensors may be used on material handling vehicles, industrial machinery, flight simulators and the like.

A typical tilt sensor produces an output signal corresponding to the angular displacement of the vehicle about orthogonal "X", "Y" and "Z" axes. The output signal from a tilt sensor may typically be an input to a host device, such as a computer, a microcontroller and/or the like which processes the signal. The X-axis, Y-axis and Z-axis input signals may be used to control the vehicle, the powered implement and/or both. The tilt sensor may also provide an input command to a computer software program. In addition to providing X-axis, Y-axis and Z-axis input signals to a computer or other device, some tilt sensors provide indicators to the operator of the vehicle of the amount of tilt in a certain axis.

Certain environmental conditions may affect the performance and/or operation of the tilt sensor. For example, extreme vibrations of the vehicle and/or the powered implement may interfere with the operation of the tilt sensor. For example, lawnmowers undergo such vibrations during mowing operations. The vibration of the engine coupled with the typically uneven terrain may cause such vibrations. The operation of the vehicle and/or the powered implement and/or user satisfaction and/or user safety may also be negatively impacted when the tilt sensor malfunctions and/or is inaccurate. Thus, many of the existing tilt sensors may be inadequate for controlling the operation of the vehicle and/or the powered implement and/or may cause numerous performance and/or safety problems when operating the vehicle and/or the powered implement.

Therefore, a need exists for a tilt sensing apparatus, a system and a method for using same to provide an indication of tilt for a vehicle.

SUMMARY OF THE INVENTION

The present invention relates generally to a tilt sensor. More specifically, the present invention relates to a tilt sensing apparatus, a system and a method for using same to provide an indication of tilt for a variety of vehicles. In particular, the vehicle may be a lawnmower.

To this end, in an embodiment, an apparatus for sensing tilt of a vehicle is provided. The apparatus may have an accelerometer mounted to the vehicle wherein the vehicle has a first axis and a second axis oriented at an angle with respect to the first axis. The accelerometer senses a first tilt angle defined between the first axis and a horizontal reference plane and generates first data associated with the first tilt angle. Further, the accelerometer senses a second tilt angle defined between the second axis and the horizontal reference plane and generates second data associated with the second tilt angle. A gyroscope is mounted to the vehicle. The gyroscope senses the first tilt angle and generates third data associated with the first tilt angle. Further, the gyroscope senses the second tilt angle and generates fourth data associated with the second tilt angle. A processor may be connected to the accelerometer and the gyroscope. The processor determines a tilt angle of the vehicle based on the first data and the second data from the accelerometer and the third data and the fourth data from the gyroscope.

In an embodiment, the processor compares the tilt angle to a first preset angle and provides a first indicator if the tilt angle exceeds the first preset angle.

In an embodiment, the processor compares the tilt angle to a second preset angle and provides a second indicator if the tilt angle exceeds the second preset angle.

In an embodiment, the accelerometer and the gyroscope generate information associated with the tilt angle relative to the first axis, the second axis, and a third axis.

In an embodiment, the accelerometer provides initial startup data and the gyroscope provides tilt data during operation of the vehicle.

In an embodiment, the first axis and the second axis are arranged perpendicular to each other.

In another embodiment of the invention, a method of determining a tilt condition of a vehicle is provided. The method has the steps of sensing an orientation of the vehicle using an accelerometer to provide first coordinates; sensing a three-dimensional orientation of the vehicle using a gyroscope to provide second coordinates; calculating the orientation of the vehicle based upon the first coordinates and the second coordinates; and comparing the orientation of the vehicle to a preset tilt limit to determine whether the vehicle is in the tilt condition.

In an embodiment, the method has the step of accumulating the first coordinates and the second coordinates prior to calculating the orientation of the vehicle.

In an embodiment, the orientation is sensed in three dimensions.

In an embodiment, the method has the step of generating a signal of the tilt condition of the vehicle.

In an embodiment, the method has the step of comparing the tilt angle to a preset value and generating a signal if the a tilt angle exceeds the preset value.

In an embodiment, the method has the step of providing a panel for communicating information associated with the tilt of the vehicle to the operator of the vehicle.

In an embodiment, the method has the step of providing a communications module having at least one of an audible indication or a visual indication to an operator of the vehicle.

In an embodiment, the method has the step of disabling a power take-off connected to the vehicle in response to a tilt condition which exceeds the preset tilt limit.

In an embodiment, the method has the step of storing information associated with the tilt condition of the vehicle.

In another embodiment, a system for sensing tilt of a vehicle is provided. The system may have an accelerometer configured to sense a first tilt angle and a second tilt angle relative to a horizontal reference plane and to generate a first tilt output and a second tilt output. A gyroscope may be configured to sense the first tilt angle and the second tilt angle and to generate a third tilt output and a fourth tilt output. A controller may be configured to receive the first tilt output and the second tilt output from the accelerometer and the third tilt output and the fourth tilt output from the gyroscope wherein the controller determines a tilt angle of the vehicle based on the first tilt output, the second tilt output, the third tilt output and the fourth tilt output.

In an embodiment, a communications module may be configured to provide an indication associated with the tilt angle of the vehicle to an operator of the vehicle.

In an embodiment, the system may have a multimedia panel for presenting information associated with the tilt of the vehicle to the operator of the vehicle.

In an embodiment, the system may have a wiring harness having an electrical interface connecting the controller, the accelerometer and the gyroscope.

In an embodiment, the system may have a relay connected to the controller wherein the relay disables a power take-off connected to the vehicle in response to a tilt angle which exceeds a preset tilt limit.

It is, therefore, an advantage of the present invention is to provide a tilt sensing apparatus, a system and/or a method that may provide an indication of tilt for a variety of vehicles.

Another advantage of the present invention is to provide a tilt sensing apparatus, a system and/or a method that may provide a warning to an operator of a vehicle in the event of an imminent tilt condition.

A further advantage of the present invention is to provide a tilt sensing apparatus, a system and/or a method that may provide a visual indicator for an operator.

Yet another advantage of the present invention is to provide a tilt sensing apparatus, a system and/or a method that may provide an audible indicator for an operator.

An advantage of the present invention is to provide a tilt sensing apparatus, a system and/or a method that may disconnect a PTO from the vehicle and an implement in a tilt condition of the vehicle.

Still another advantage of the present invention is to provide a tilt sensing apparatus, a system and/or a method that may disconnect a PTO from the vehicle and the implement upon disconnection of a wiring harness.

A further advantage is to provide a tilt sensing apparatus, a system and/or a method that may be capable of distinguishing between tilt of the vehicle and vibrations and/or other minor disturbances.

Another advantage of the present invention is to provide a tilt sensing apparatus, a system and/or a method that may provide a three-axis accelerometer to detect tilt of a vehicle.

A further advantage of the present invention is to provide a tilt sensing apparatus, a system and/or a method that may provide a three-axis gyroscope to detect tilt of a vehicle.

Yet another advantage of the present invention is to provide a tilt sensing apparatus, a system and/or a method that may provide a communications module for communicating information to an operator.

A further advantage of the present invention is to provide a tilt sensing apparatus, a system and/or a method that may provide an instrument panel, GPS, data recorders, data retention and/or storage and/or the like.

A further advantage is to provide a tilt sensing apparatus, a system and/or a method that may be capable of distinguishing between tilt of a lawnmower and an approximately zero radius turn of the lawnmower.

Yet another advantage of the present invention is to provide a tilt sensing apparatus, a system and/or a method that may provide an accelerometer to provide initial startup data and a gyroscope to provide primary tilt data during operation.

Additional features and advantages of the present invention are described in, and will be apparent from, the detailed description of the presently preferred embodiments and from the drawings.

DETAILED DESCRIPTION OF THE PREFERRED EMBODIMENTS

The present invention generally relates to a tilt sensor. More specifically, the present invention relates to a tilt sensing apparatus, a system and a method for using same to provide an indication of tilt for a variety of vehicles. In particular, the vehicle may be a lawnmower.

To this end, in an embodiment, an apparatus for sensing tilt of a vehicle is provided. The apparatus may have an accelerometer mounted to the vehicle wherein the vehicle has a first axis and a second axis oriented at an angle with respect to the first axis. The accelerometer senses a first tilt angle defined between the first axis and a horizontal reference plane and generates first data associated with the first tilt angle. Further, the accelerometer senses a second tilt angle defined between the second axis and the horizontal reference plane and generates second data associated with the second tilt angle. A gyroscope is mounted to the vehicle. The gyroscope senses the first tilt angle and generates third data associated with the first tilt angle. Further, the gyroscope senses the second tilt angle and generates fourth data associated with the second tilt angle. A processor may be connected to the accelerometer and the gyroscope. The processor determines a tilt angle of the vehicle based on the first data and the second data from the accelerometer and the third data and the fourth data from the gyroscope.

In another embodiment of the invention, a method of determining a tilt condition of a vehicle is provided. The method has the steps of sensing an orientation of the vehicle using an accelerometer to provide first coordinates; sensing a three-dimensional orientation of the vehicle using a gyroscope to provide second coordinates; calculating the orientation of the vehicle based upon the first coordinates and the second coordinates; and comparing the orientation of the vehicle to a preset tilt limit to determine whether the vehicle is in the tilt condition.

Figure 1A:
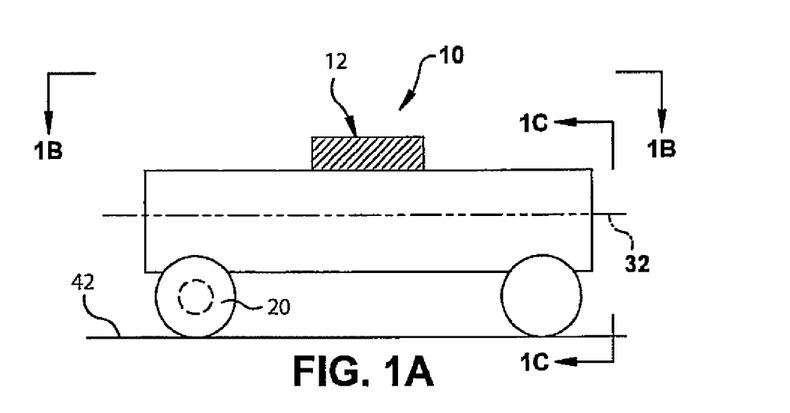
FIG. 1A is a side elevation view of a diagram of a vehicle with a tilt sensing system in an embodiment of the present invention.
Figure 1B:
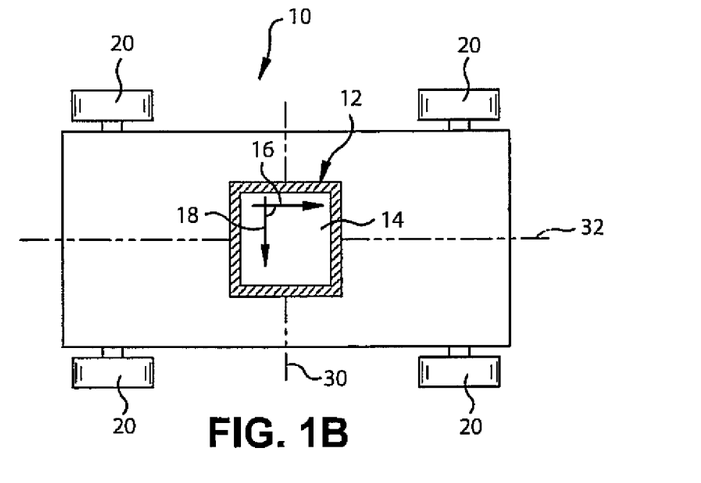
FIG. 1B is a view taken along lines 1B-1B in FIG. 1A.
Figure 1C:
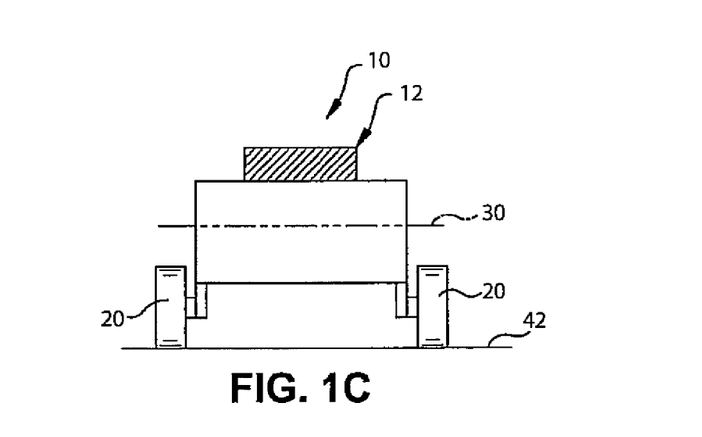
FIG. 1C is a view taken along lines 1C-1C in FIG. 1A.

Referring now to the drawings wherein like numerals refer to like parts, FIGS. 1A-1C illustrate a schematic diagram of a vehicle 10. The vehicle 10 may have a tilt sensing apparatus 12. The tilt sensing apparatus 12 may have a tilt sensing device 14. The tilt sensing device 14 is configured to sense a tilt in a first sensing axis 16 and a tilt in a second sensing axis 18. As described in more detail below, by sensing the tilt angles of the two sensing axes 16, 18, the tilt sensing device 14 may determine a maximum tilt angle of the vehicle 10.

The vehicle 10 illustrated in FIGS. 1A-1C is generic since the tilt sensing apparatus 12 may be implemented on a wide variety of different types of vehicles. The vehicle illustrated by FIGS. 1A-1C includes wheels 20 and a frame or body 22. As shown, the vehicle 10 may have imaginary axes of tilt or rotation. For example, a side-to-side vehicle axis 30 and a front-to-back vehicle axis 32 are shown in FIGS. 1A-1C.

Figure 2:
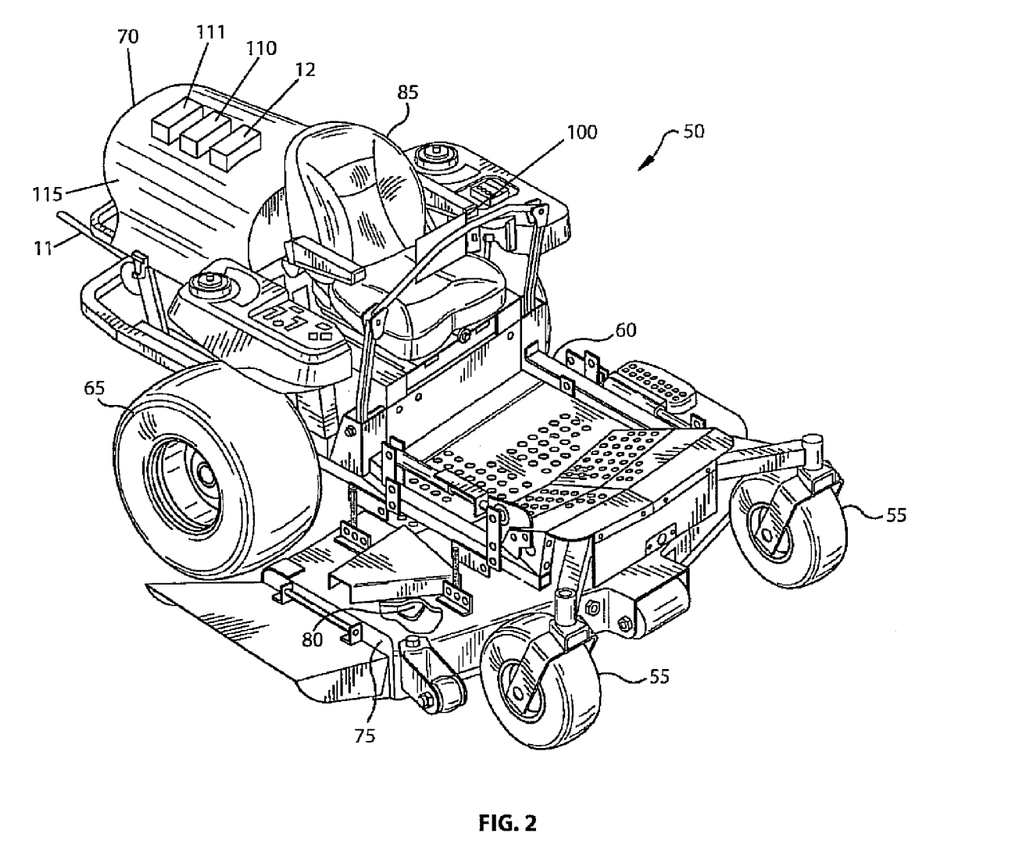
FIG. 2 is a perspective view of a lawnmower with the tilt sensing system in an embodiment of the present invention.

As shown in FIG. 2, the vehicle 10 may be a lawnmower 50. The position of the vehicle 10 or the lawnmower 50 on a slope 40 may define a tilt angle θ of the vehicle 10 or the lawnmower 50 with respect to a horizontal reference plane 42. The tilt angle θ is approximately zero degrees with the vehicle 10 or lawnmower 50 on a flat, level, horizontal surface. The tilt angle θ may increase with the vehicle 10 or the lawnmower 50 operating on an incline or traversing uneven terrain. The tilt angle θ may be calculated by sensing the tilt relative to the horizontal reference plane 42 or a vertical reference line 44.

The tilt sensing apparatus 12 may be particularly useful on vehicles 10 that have powered implements for performing a variety of different operations. Such vehicles 10 may have a PTO 11. The PTO 11 may be used to provide power to an implement or separate machine. The PTO 11 may allow implements to use power from the vehicle 10. Vehicles 10 with powered implements may benefit from the tilt sensing apparatus 12 to prevent accidental separation of the PTO 11 on the vehicle 10 from the implement. For example, excessive tilt on the vehicle 10 may cause the PTO 11 to disconnect from the implement. The tilt sensing apparatus 12 may be used on any vehicle 10 that is self-propelled and that an operator may ride upon. The tilt sensing apparatus 12 may be beneficial for such vehicles 10 that do not include an enclosed cabin for the operator to protect the operator from harm and/or injury in the event of a rollover of the vehicle 10. In an embodiment, the tilt sensing apparatus 12 may have a multimedia panel for presenting information associated with the tilt of the vehicle 10 to, for example, an operator of the vehicle 10. specifically, the multimedia panel may be and/or have a display panel 100 as shown in, for example, FIG. 2, for indicating a condition of the tilt sensing apparatus 12 to an operator.

In an exemplary vehicle illustrated in FIG. 2, the vehicle may be the lawnmower 50 with a tilt sensing apparatus 12. The lawnmower 50 may also have a PTO 11. The lawnmower 50 may be of a type referred to as a "zero radius" lawnmower. For example, such lawnmowers may have front caster wheels 55 attached at the front of the lawnmower 50. The front caster wheels 55 may swivel to enable zero radius turning of the lawnmower 50.

Typically, the lawnmower 50 may have a frame 60. The front caster wheels 55 may be connected at the front of the frame 60. Rear wheels 65 may be connected at the rear of the frame 60. Typically, the rear wheels 65 may be the drive wheels which propel the lawnmower 50 in a forward direction and/or in a reverse direction. The drive wheels 65 may be independently controlled and/or operated. Further, the rear wheels 65 may be driven by an engine 70. A mower deck 75 may be suspended from the frame 60. A cutting blade 80 may be connected and/or arranged under the mower deck 75 and may be driven by the engine 70. A seat 85 for the operator may be supported by the frame 55.

In an embodiment, the display panel 100 may be provided. The display panel 100 may be located for use by the operator. For example, the display panel 100 may be located in front of the seat 85 as shown in FIG. 2. However, the display panel 100 may be located in other locations on the lawnmower 50, such as, for example, on either side of the seat 85. The display panel 100 may provide information to the operator related to the position and/or tilt of the lawnmower 50. The display panel 100 may also have an instrument panel, GPS, data recorders, data retention and/or storage and/or the like. In an embodiment, the display panel 100 may be mounted to a gimbal on the floor of the vehicle 10 and/or on the dashboard of the vehicle.

In an embodiment, the tilt sensing device 14 may have an accelerometer 110 and/or a gyroscope 111. As shown in FIG. 2, the accelerometer 110 and/or the gyroscope 111 may be located on an engine cover 115. However, the accelerometer 110 and/or the gyroscope 111 may be located in other positions on the lawnmower 50. The accelerometer 110 may provide initial startup data and the gyroscope 111 may provide primary tilt data during operation of a system 200 and/or a method of the present invention. For example, the accelerometer 110 may be used in the initial calibration of the system 200.

Figure 3:
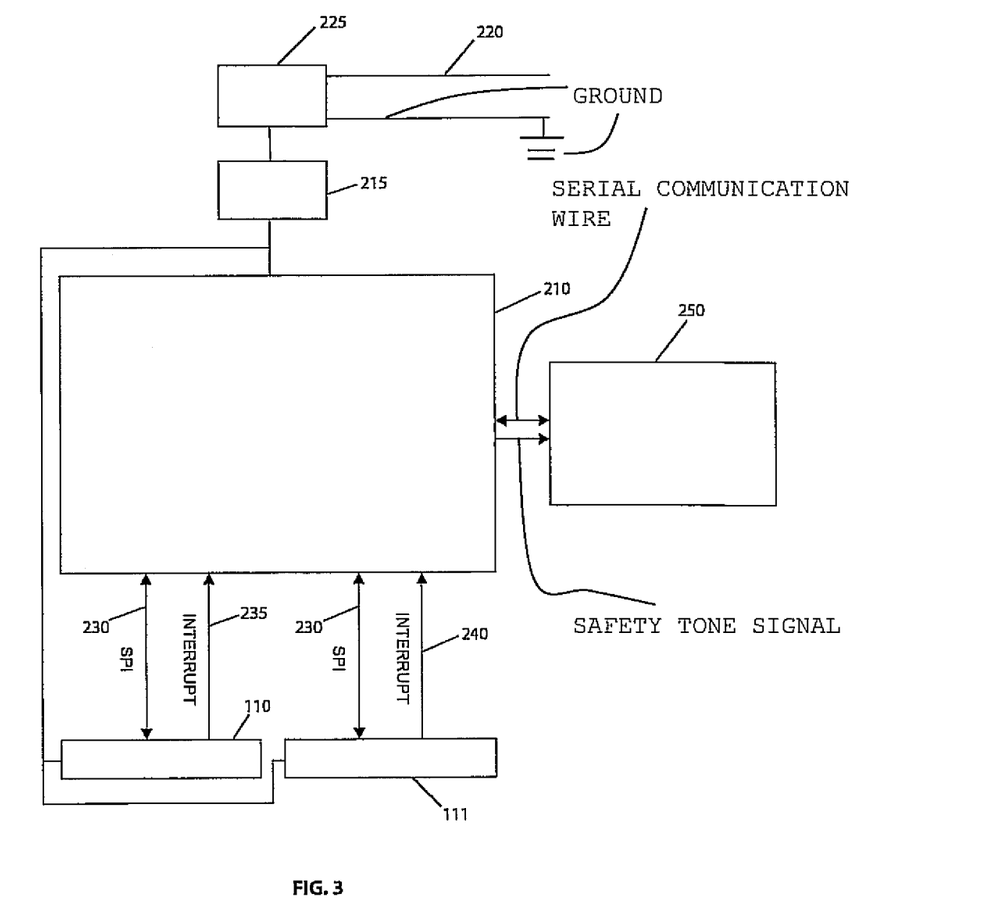
FIG. 3 is a schematic diagram of the tilt sensing system illustrating electrical connections in an embodiment of the present invention.

FIG. 3 is a schematic diagram of the tilt sensing apparatus 12 of the system 200. In particular, FIG. 3 illustrates electrical connections and data flows in an embodiment of the present invention. The tilt sensing apparatus 12 may have a first microcontroller 210. The first microcontroller 210 may be mounted to a printed circuit board (not shown) and may receive power from a power supply 215. The power supply 215 may be connected to a voltage source 220. The voltage source 220 may be a twelve volt source, for example. A protection circuit 225 may be provided between the voltage source 220 and the power supply 215. The protection circuit 225 may have voltage regulation and or voltage conditioning to prevent damage to the power supply 215 and/or the first microcontroller 210.

In an embodiment, the first microcontroller 210 may be connected to the accelerometer 110 via a small peripheral interface ("SPI") 230. The SPI 230 may be a serial connection. The SPI 230 may be bi-directional as shown in FIG. 3. The first microcontroller 210 may also be connected to the gyroscope 111 via a small peripheral interface ("SPI") 230. An interrupt 235 may be provided between the accelerometer 110 and the first microcontroller 210. Another interrupt 240 may be provided between the gyroscope 111 and the first microcontroller 210. The interrupts 235, 240 may have a smart sensor that may allow an operator to set degree settings for tilt of the tilt sensing apparatus 12. Operations of the SPI 230 and/or the interrupts 235, 240 may be further described hereafter with reference to the method of the present invention.

As shown in FIG. 3, the accelerometer 110 may be a three-axis accelerometer. Also, the gyroscope 111 may be a three-axis gyroscope. The three-axis accelerometer 110 may correspond to orthogonal axes X, Y, and Z. The three-axis gyroscope 111 may correspond to orthogonal axes X, Y, and Z.

The accelerometer 110 and/or the gyroscope 111 may be used as tilt sensors of the tilt sensing device 14. The X-axis may correspond to the first sensing axis 16 and sense a first tilt angle. Similarly, the Y-axis may correspond to the second sensing axis 18 and sense a second tilt angle. The Z-axis may correspond to a third sensing axis, positioned orthogonally to both the X-axis and Y-axis, generally pointing up with the vehicle 10 positioned on the horizontal reference plane 32 and sensing the tilt angle relative to the vertical reference line 44. The tilt sensing device 14 may generate a first tilt signal corresponding to the first tilt angle (X-axis), a second tilt signal corresponding to the second tilt angle (Y-axis), and a third tilt signal corresponding to the tilt relative to the vertical reference line 44 (Z-axis).

The tilt sensing apparatus 12 of the system 200 may have a communications module 250 connected to the first microcontroller 210. The communications module 250 may have multiple features, functions and/or capabilities. For example, the communications module 250 may be connected to the display panel 100. The communications module 250 may have an instrument panel, GPS, data retention and/or storage, data recorders and/or the like. The communications module 250 may also have visual and/or audible indicators, for example. The visual and/or audible indicators may be provided on the display panel 100.

Further, the tilt sensing apparatus 12 of the system 200 may have a single wire serial interface. The tilt sensing apparatus 12 may also have data recording. A count accumulator may record each time a set angle may be obtained and/or surpassed, such as, a tilt condition of fifteen degrees or greater may be obtained or surpassed, for example. A thirty second data recorder may record up to a set angle. Angle magnitudes and turn degrees may be recorded. For example, in a tilt condition in which a forty-five degree tilt may be obtained and/or surpassed, all angles within the thirty second time period leading up to the forty-five degree angle condition may be recorded, along with rotations performed perpendicular to the ground, for example, the Z axis.

Figure 4:
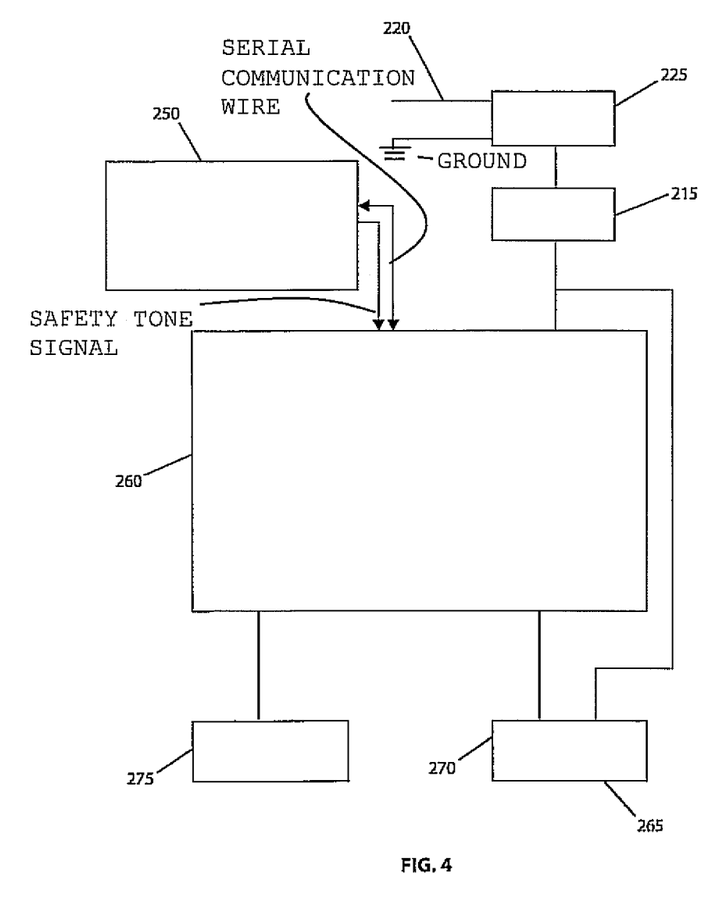
FIG. 4 is a schematic diagram of the tilt sensing system illustrating wiring harness connections in an embodiment of the present invention.

FIG. 4 is a schematic diagram of the system 200 for sensing tilt illustrating wiring harness connections in an embodiment of the present invention. A second microcontroller 260 may be mounted to the printed circuit board (not shown) and may receive power from the power supply 215. The power supply 215 may be connected to the voltage source 220. The voltage source 220 may be a twelve volt source, for example. The protection circuit 225 may be provided between the voltage source 220 and the power supply 215. The protection circuit 225 may have voltage regulation and or voltage conditioning to prevent damage to the power supply 215 and/or the second microcontroller 260.

The second microcontroller 260 may be connected to the communications module 250 via a bi-directional connection 262. In an embodiment, the bi-directional connection 262 may be a four-wire serial connection, for example. Pin 1 may have one wire serial data. Pin 2 may have +12V. Pin 3 may have the control signal. Pin 4 may be a ground. The wiring harness 266 may have an input. The input may be a control signal from tilt sensing apparatus 12.

The second microcontroller 260 may be connected to accessories, such as, a buzzer 265, a light 270 and/or a relay 275, for example. The buzzer 265 may provide an audible indication to the operator in response to certain tilt conditions of the lawnmower 50. The light 270 may provide a visual warning to the operator in response to certain tilt conditions of the lawnmower 50. The light 265 may be an LED or other light indicator. In an embodiment, the buzzer 265 and the light 270 may operate together to provide audible and visual indications and/or warnings to the operator of the lawnmower 50 and/or the vehicle 10. For example, at a tilt condition of approximately fifteen degrees, the buzzer 265 may produce an audible sound at a first frequency and the light 270 may produce a light that may flash in unison with the audible sound at the same frequency. At a tilt condition of approximately forty-five degrees, the buzzer 265 may produce an audible sound at a second frequency and the light 270 may produce a light that may flash in unison with the audible sound at the second frequency. The second frequency may be greater than the first frequency. The greater frequency may indicate a greater tilt of the lawnmower 50. Thus, the operator may recognize and/or may distinguish the tilt condition of approximately fifteen degrees from the tilt condition of approximately forty-five degrees by the difference in frequency of the sound of the buzzer 265 and the rate of flashing of the light 270.

Further, at a tilt condition of approximately forty-five degrees, the relay 275 may shut off the PTO 11. The tilt sensing apparatus 12 of the system 200 may provide a wiring harness control signal to trigger attached accessories, such as, the buzzer 265, the light 270 and/or the relay 275.

For example, the first microcontroller 210 may produce a tone that may be provided to the communications module 250 via a control cable 264 of a wiring harness 266. The first microcontroller 210 may produce a tone having a frequency of approximately 1,000 Hertz, for example. The 1,000 Hertz tone may be provided to the communications module 250 to indicate a satisfactory condition for the system 200. For example, the lawnmower 50 may be relatively level and not in a tilt condition. The first microcontroller 210 may also produce a tone having a frequency of approximately 500 Hertz, for example. The 500 Hertz tone may indicate that the lawnmower 50 may be in a tilt condition of greater than approximately 15 degrees, for example. The amount of tilt angle may be set to other angles of tilt, as desired. Further, the first microcontroller 210 may produce a tone having a frequency of zero Hertz. The zero Hertz tone may indicate that the lawnmower 50 may be in a tilt condition of greater than approximately 45 degrees, for example. The amount of tilt angle may be set to other angles of tilt, as desired. Further, the communications module 250 may receive no tone from the first microcontroller 210 which may indicate that the wiring harness 266 has been disconnected and/or severed, for example. The PTO 11 may be disabled in a zero Hertz condition indicating a tilt condition of greater than approximately 45 degrees or in a no tone condition indicating a disconnection of the wiring harness 266. Thus, the first microcontroller 210 may provide a safety feature for the system 200 on the lawnmower 50 by disabling the PTO 11 in such conditions.

Figure 5:
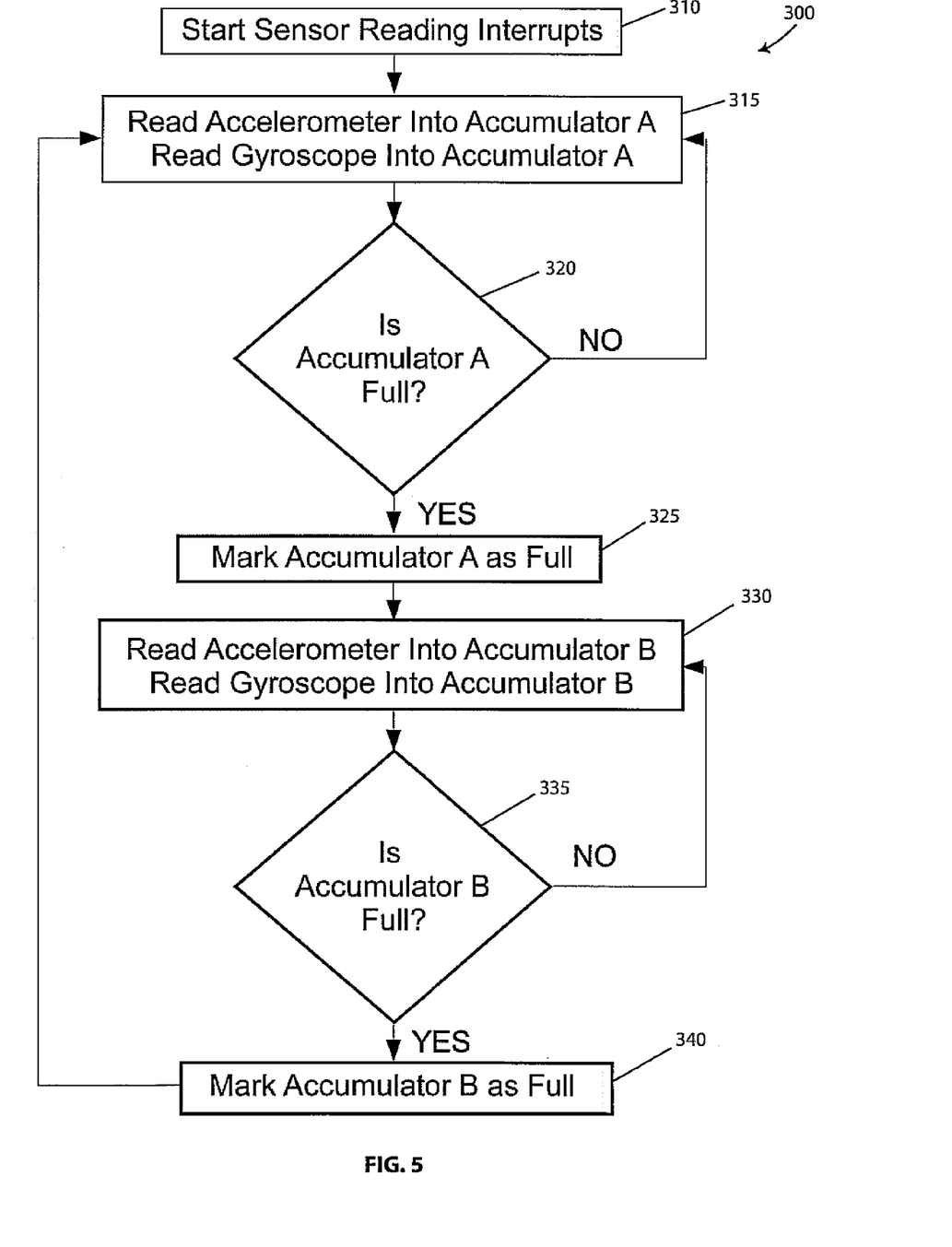
FIG. 5 is a flowchart illustrating accumulator operations in a system and a method for detecting tilt in an embodiment of the present invention.

FIG. 5 is a flowchart illustrating accumulator operations 300 in the system 200 and/or the method for detecting tilt in an embodiment of the present invention. For example, upon start up of the system 200, both the accelerometer 110 having an internal microprocessor (not shown) and the gyroscope 111 having an internal microprocessor (not shown) may begin to respectively trigger and/or send interrupts to the first microprocessor 210 via the interrupt 325 and the interrupt 240 as shown in step 310 of the accumulator operations of the method illustrated in FIG. 5. The interrupts may indicate that the accelerometer 110 and/or the gyroscope 111 may have data to send to the first microprocessor 210. Each of the internal microprocessors in the accelerometer 110 and the gyroscope 111 may send interrupts at a different rate. For example, the accelerometer 110 may send interrupts at a rate of 800 Hertz. The gyroscope 111 may send interrupts at a rate of 760 Hertz. To synchronize the reading of the data from the accelerometer 110 and the gyroscope 111 and to allow collection of the data to proceed at a constant rate during further processing, two accumulator objects, for example, Accumulator A and Accumulator B, may be provided.

The data may be read from the accelerometer 110 and from the gyroscope 111 into The Accumulator A as shown in step 315. The Accumulator A may collect data until the Accumulator A may be full as shown in decision step 320 of FIG. 5. The Accumulator A may then be marked as full as shown in step 325. If the Accumulator A may not be full, as shown in the decision step 325, further data may be read from the accelerometer 110 and from the gyroscope 111 into the Accumulator A.

The data may be read from the accelerometer 110 and from the gyroscope 111 into the Accumulator B as shown in step 330. The Accumulator B may collect data until the Accumulator B may be full as shown in decision step 335 of FIG. 5. The Accumulator B may be marked as full as shown in step 340. If the Accumulator B may not be full, as shown in the decision step 335, further data may be read from the accelerometer 110 and from the gyroscope 111 into the Accumulator B.

The Accumulator A may collect data for a time period of 100 milliseconds from each of the accelerometer 110 and from the gyroscope 111, for example. Different collection times may be used. The interrupts 235, 240 from the accelerometer 110 and the gyroscope 111, respectively, may add data to the Accumulator A. The data collection time may pass, and the Accumulator A may have been filled with data from both the accelerometer 110 and the gyroscope 111. Thus, the Accumulator A may be marked as full and/or ready to use as shown in step 325. The Accumulator A may be ready for use by a main processing loop shown in FIGS. 6A and 6B.

At this point of the method, the Accumulator B may begin to fill with data as shown in step 330. Upon completion of the time span of data collection and the Accumulator B may have been filled with data from both the accelerometer 110 and the gyroscope 111, the Accumulator B may be marked as full and/or ready to use as shown in step 340. The Accumulator B may also be ready for use by the main processing loop shown in FIGS. 6A and 6B.

Figure 6A:
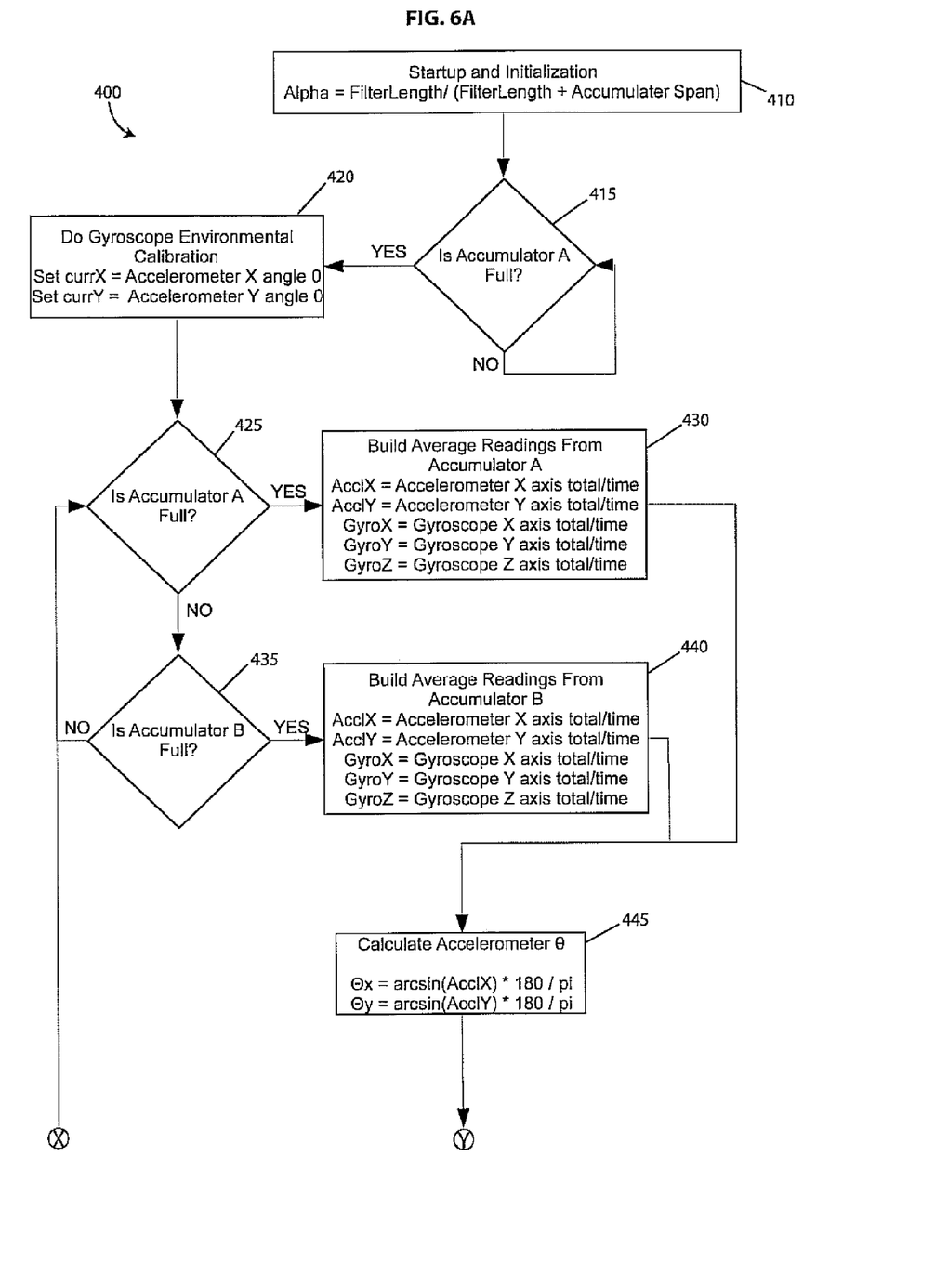
FIG. 6A is a flowchart illustrating a main processing loop of a method for detecting tilt in an embodiment of the present invention.
Figure 6B:
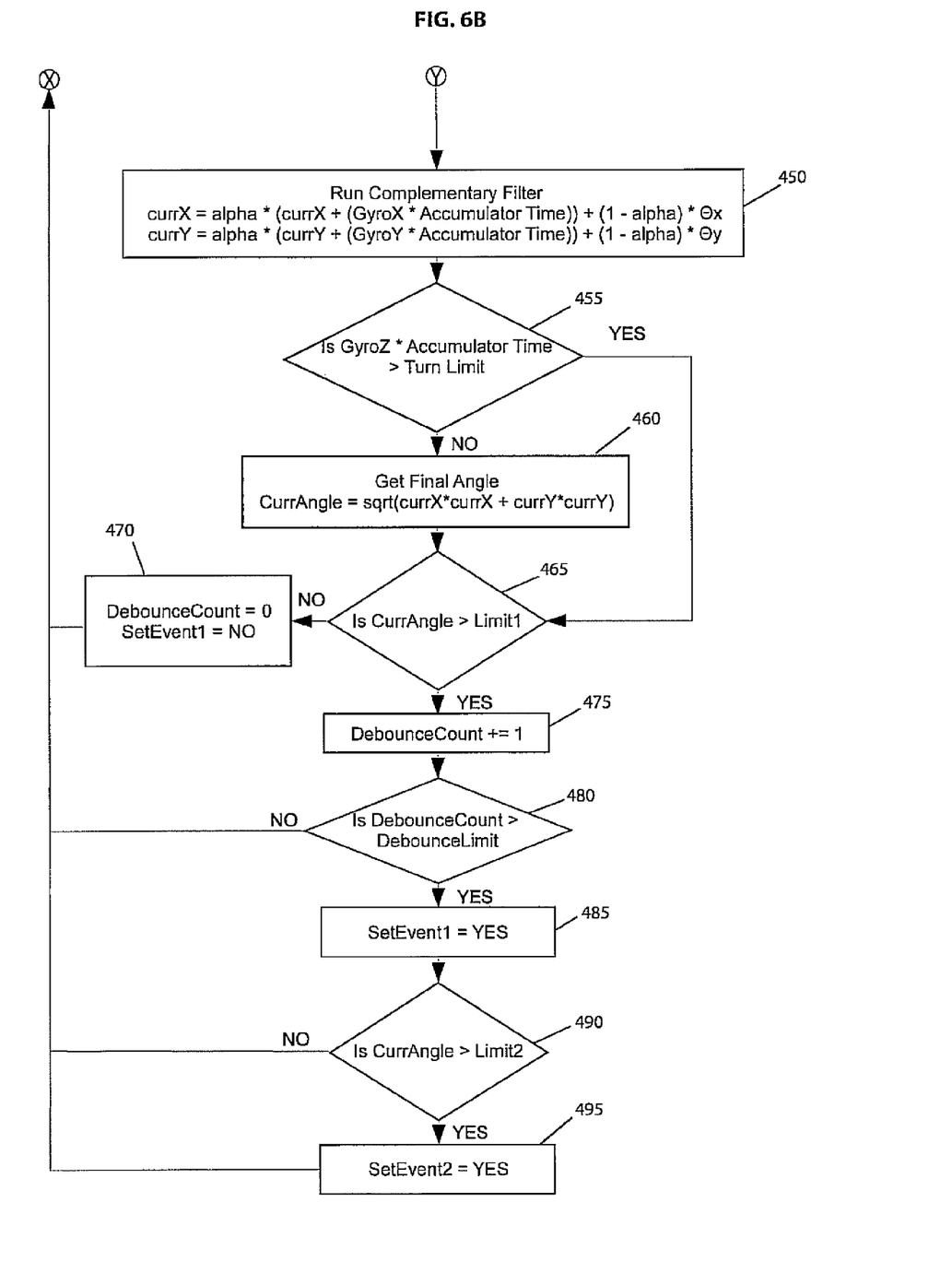
FIG. 6B is a flowchart illustrating a main processing loop of a method for detecting tilt in an emobodiment of the present invention.

FIGS. 6A and 6B illustrate is a flowchart illustrating a main processing loop 400 of the method for detecting tilt in an embodiment of the present invention. Upon start up of the system 200, the main processing loop 400 may calculate a constant alpha as shown in step 410. The constant alpha may be used in a complementary filter equation in step 450 of FIG. 6B. The complementary filter equation may weigh the inputs from both the gyroscope 111 and the accelerometer 110 to filter any jumps in data less than the seconds indicated in a variable entitled FilterLength as shown in step 410. Next, the system 200 may wait for the first accumulator, the Accumulator A, to trigger as full as shown in step 415 to build initial calibrations and position calculations for the system 200. In step 420, a reading of the gyroscope 111 may be used to build a set of constants to indicate an average level of background noise. The average level of background noise may be filtered from all further calculations in the main processing loop 400. The readings from the accelerometer 110 may then be used to produce the starting pitch and roll of the system 200.

The system 200 may perform environmental calibration prior to operation. After the environmental calibration and the initial position may be set, the main processing loop 400 may start to scan whether either the Accumulator A may be full as shown in step 425 or the Accumulator B may be full as shown in step 435. When the system 200 may detect that the Accumulator A may be full, the system 200 may use the data from the Accumulator A to calculate a new position for the system 200 board as shown in step 430. When the system 200 may detect that the Accumulator B may be full, the system 200 may begin to use the data from the Accumulator B to calculate a new position for the system 200 as shown in step 440.

Readings from the accelerometer 110 may give the average position angle theta θ of the system 200 board in radians across two axes X and Y for the collection time as shown in step 445. The readings from the gyroscope 111 may give the average change of degrees around three axes, X, Y and Z for the collection time. The readings from the accelerometer 110 may be converted from radians to degrees. The matching X and Y axes data for the gyroscope 111 and the accelerometer 110 may be run through the complementary filter equation as shown in step 450.

The complementary filter equation shown in step 450 may operate as a low-pass filter by weighing changes in position in both the accelerometer 110 and gyroscope 111. The complementary filter equation may rely more upon the gyroscope 111 since the gyroscope 111 may be less affected by noise and/or may have a quicker reaction time than the accelerometer 110. Also, short bumps in the accelerometer 110 may be filtered. However, depending solely on the gyroscope 111 may produce some drift in the calculations over time. Therefore, the relative long term stability of the accelerometer 110 may be used to control and/or assure the accuracy of the position over the long term. After the complementary filter equation shown in step 450 may be used to produce the new position of both the X and Y axes of the system 200, the magnitude of both positions may be taken to be used as a current output angle theta θ as shown in step 460 of the system 200. In an embodiment, the system 200 may have a current angle refresh rate for the current output angle theta θ of approximately 100 milliseconds. The system 200 may have an angle resolution of approximately 0.1 degrees and an angle accuracy of ±0.05 degrees.

The current output angle theta θ may be tested against a set limit as shown in step 465. For example, the set limit may be a certain angle which may be preset in the system 200. The set limit may correspond to a desired tilt sensing trigger for the system 200. For example, an angle of approximately forty-five degrees may indicate an unsafe tilt condition for the system 200 and/or the lawnmower 50. However, the set limit may be any angle greater than zero degrees up to an angle of approximately ninety degrees. At least one set limit may be preset at the manufacturer of the system 200.

In an embodiment, the set limit may have a first set limit. For example, the first set limit may be approximately fifteen degrees. The first set limit may be labeled Limit1 in step 465. The first set limit Limit1 may correspond to a tilt condition of the system 200 and/or the lawnmower 50 in which the lawnmower 50 may be in a tilt condition of approximately fifteen degrees.

The set limit may also have a second set limit labeled Limit2 in step 490. The second set limit Limit2 may be an angle of approximately forty-five degrees, for example. The second set limit Limit2 may correspond to a tilt condition of the system 200 and/or the lawnmower 50 in which the lawnmower 50 may be in a tilt condition of approximately forty-five degrees.

The current output angle theta θ may be monitored to eliminate false positives. For example, the current output angle theta θ may be compared to the first set limit Limit1 as shown in step 465. The current output angle theta θ may less than the first set limit Limit1. In this condition, a debounce counter may be set equal to zero as shown in step 470.

Alternatively, the current output angle theta θ may exceed the first set limit Limit1. For such a value of the current output angle theta θ, the debounce counter may be incremented as shown in step 475. The debounce counter may be incremented for each pass of the main processing loop 400. A debounce limit may be set to eliminate false positives. The debounce limit may be set to three, for example. Thus, the current value of the debounce counter may be compared to the debounce limit as shown in step 480. In the event the debounce counter may exceed the debounce limit, a first event flag SetEvent1 may be set as shown in step 485.

The current output angle theta θ may also be compared to the first set limit Limit1 as shown in step 490. The current output angle theta θ may exceed the second set limit Limit2. In the event the current output angle theta θ may exceed the second set limit Limit2, a second event flag SetEvent2 may be set as shown in step 495.

Thus, the debounce counter may reach the first set limit Limit1. As a result, the first event flag SetEvent1 may be set as shown in step 485. Further, the current output angle theta θ may exceed the second set limit Limit2, and a second event flag SetEvent2 may be set as shown in step 495. Up to and at this point in the main processing loop 400, in the event that the current output angle theta θ may ever fall below the first event limit Limit1 and/or the second event limit Limit2, the debounce counter may be set back to zero and the respective event flag may be cleared. After the first event flag SetEvent1 may be set, the current output angle theta θ may then be tested against the higher limit of the second set limit Limit2. In the event that the second set limit Limit2 may be exceeded, the second event flag SetEvent2 may be set as shown in step 495 and may remain so until reboot of the system 200.

Another safeguard against false positives at this stage in the main processing loop 400 of the method of the invention may use the Z axis of the gyroscope 111 to test if the system 200 may be in a turn as shown in step 455. Heavy rotation around the Z axis may cause a centripetal force reading on the gyroscope 111 that may lead to a false positive on the current output angle theta θ. When the safeguard may be triggered, the last current output angle theta θ may be locked until such time as the Z axis change may be reduced down to normal levels. Doing so may filter a zero radius turn, for example.

After performance of all of the foregoing steps, the main processing loop 400 may return to a waiting state for the next accumulator to trigger full and begin the main processing loop 400 again.

Figure 7:
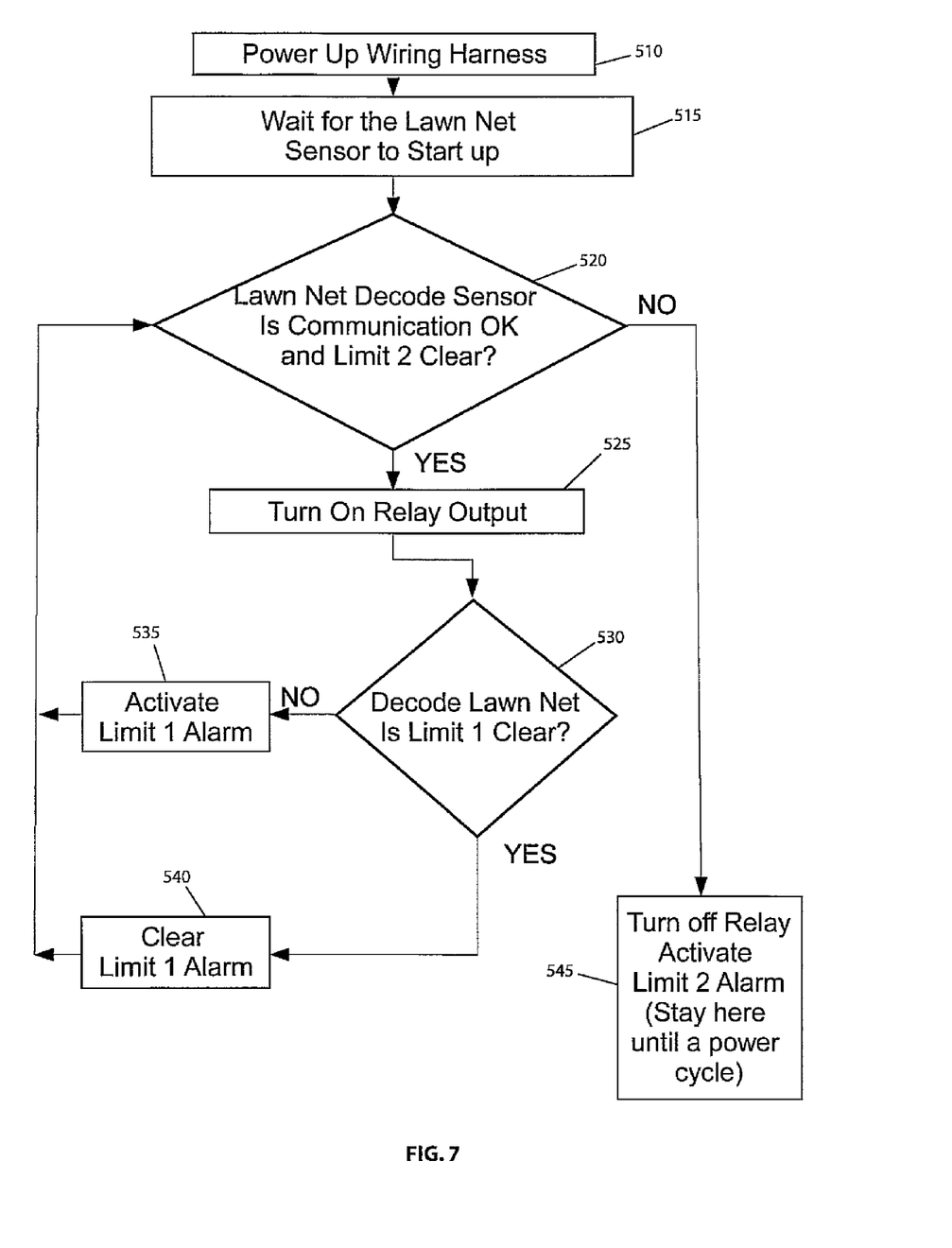
FIG. 7 is a flowchart illustrating wiring harness operations in a system and a method for detecting tilt in an embodiment of the present invention.

FIG. 7 is a flowchart illustrating wiring harness operations 500 in the system 200 and the method for detecting tilt in an embodiment of the present invention. In step 510, the wiring harness 266 may be powered. In step 515, the system 200 may wait for the tone from the first microcontroller 210 to be sent to the communications module 250. The tone may be decoded to determine the frequency of the tone as shown in step 520.

Also, the system 200 may determine whether Limit2 may be clear or not in step 520. Limit2 may indicate a tilt condition of forty-five degrees. If Limit2 is not clear, the relay 275 may be turned off and the Limit2 alarm may be activated as shown in step 545. If Limit2 is clear, the output of the relay 275 may be turned on as shown in step 525.

Further, the system 200 may determine whether Limit1 may be clear or not in step 520. Limit1 may indicate a tilt condition of fifteen degrees. If Limit1 is not clear, the Limit1 alarm may be activated as shown in step 535. If Limit1 is clear, the Limit1 alarm may be cleared as shown in step 540.

Other variations and/or geometric configurations which are known to one having ordinary skill in the art are possible and are deemed to be within the scope of this disclosure. The materials used for the components of the tilt sensing apparatus 12 and/or the system 200 may be selected from any suitable material to perform the desired function for operation of the tilt sensing apparatus 12 and/or the system 200. The materials must also be capable of withstanding environmental conditions that may be encountered. Considerations of performance and/or reliability are also important in the selection of the material. Other materials which are known to one having ordinary skill in the art may be selected and are deemed to be within the scope of this disclosure. The tilt sensing apparatus 12 and/or the system 200 may have additional components which may provide enhanced functionality of the tilt sensing apparatus 12 and/or system 200.

Moreover, the present invention is not limited to the specific arrangement of the components of the tilt sensing apparatus 12 and/or the system 200 illustrated in the drawings. It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

The invention claimed is:

1. An apparatus for sensing tilt of a vehicle comprising:
   an accelerometer mounted to the vehicle wherein the vehicle has a first axis and a second axis wherein the second axis is oriented at an angle with respect to the first axis wherein the accelerometer senses a first tilt angle defined between the first axis and a horizontal reference plane wherein the accelerometer generates a first piece of data associated with the first tilt angle wherein the accelerometer senses a second tilt angle defined between the second axis and the horizontal reference plane and generates a second piece of data associated with the second tilt angle and further wherein the accelerometer senses the first tilt angle and the second tilt angle after an initial calibration of the accelerometer;
   a gyroscope mounted to the vehicle wherein the gyroscope senses the first tilt angle and generates a third piece of data associated with the first tilt angle wherein the gyroscope senses the second tilt angle and generates a fourth piece of data associated with the second tilt angle and further wherein the accelerometer is used to correct for gyroscope drift after the initial calibration of the accelerometer; and
   a processor connected to the accelerometer and the gyroscope wherein the processor determines a tilt angle of the vehicle based on the first piece of data and the second piece of data from the accelerometer and the third piece of data and the fourth piece of data from the gyroscope.

2. The apparatus of claim 1 wherein the processor compares the tilt angle to a first preset angle and provides a first indicator if the tilt angle exceeds the first preset angle.

3. The apparatus of claim 1 wherein the processor compares the tilt angle to a second preset angle and provides a second indicator if the tilt angle exceeds the second preset angle.

4. The apparatus of claim 1 wherein the accelerometer and the gyroscope generate information associated with the tilt angle relative to the first axis, the second axis, and a third axis.

5. The apparatus of claim 1 wherein the accelerometer provides initial startup data and the gyroscope provides tilt data during operation of the vehicle.

6. The apparatus of claim 1 wherein the first axis and the second axis are arranged perpendicular to each other.

7. A system for sensing tilt of a vehicle comprising:
   an accelerometer configured to sense a first tilt angle and a second tilt angle relative to a horizontal reference plane and to generate a first tilt output and a second tilt output wherein the accelerometer senses the first tilt angle and the second tilt angle based on gravitational forces prior to activation of the vehicle for an initial calibration;
   a gyroscope configured to sense the first tilt angle and the second tilt angle and to generate a third tilt output and a fourth tilt output wherein the accelerometer corrects gyroscope drift after the initial calibration; and
   a controller configured to receive the first tilt output and the second tilt output from the accelerometer and the third tilt output and the fourth tilt output from the gyroscope wherein the controller determines a tilt angle of the vehicle based on the first tilt output, the second tilt output, the third tilt output and the fourth tilt output.

8. The system of claim 7 further comprising:
   a communications module configured to provide an indication associated with the tilt angle of the vehicle to an operator of the vehicle.

9. The system of claim 7 further comprising:
   a multimedia panel for presenting information associated with the tilt of the vehicle to the operator of the vehicle.

10. The system of claim 7 further comprising:
    a wiring harness having an electrical interface connecting the controller, the accelerometer and the gyroscope.

11. The system of claim 7 further comprising:
    a relay connected to the controller wherein the relay disables a power take-off connected to the vehicle in response to a tilt angle which exceeds a preset tilt limit.

* * * * *